Inventors
ANTHONY R. BARRINGER
SHOLLY KAGAN
by: Cavanagh & Norman

July 16, 1963 A. R. BARRINGER ET AL 3,098,197
METHOD AND APPARATUS FOR THE MEASUREMENT OF MAGNETIC FIELDS
Filed Aug. 9, 1960 4 Sheets-Sheet 2

Inventors
ANTHONY R. BARRINGER
SHOLLY KAGAN
by: Cavanagh & Norman

Inventors
ANTHONY R. BARRINGER
SHOLLY KAGAN
by: Cavanagh & Norman

July 16, 1963  A. R. BARRINGER ET AL  3,098,197
METHOD AND APPARATUS FOR THE MEASUREMENT OF MAGNETIC FIELDS
Filed Aug. 9, 1960  4 Sheets-Sheet 4
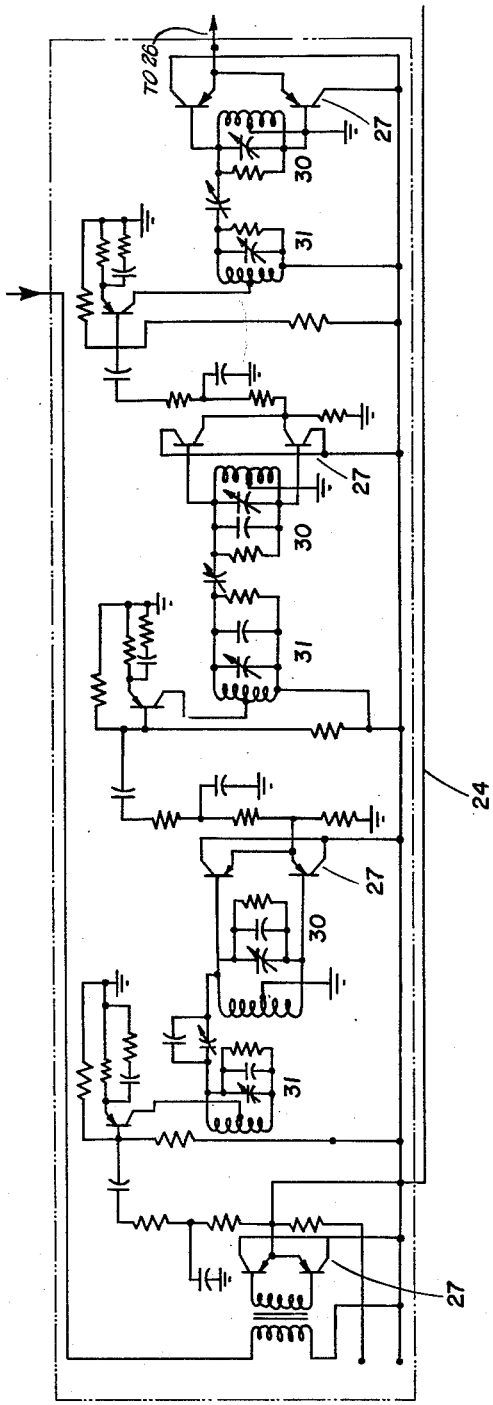
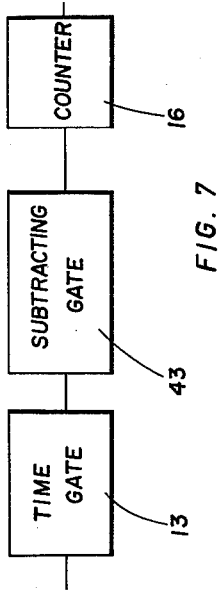
*Inventors*
ANTHONY R. BARRINGER
SHOLLY KAGAN
by: *Cavanagh & Norman*

United States Patent Office 3,098,197
Patented July 16, 1963

3,098,197
METHOD AND APPARATUS FOR THE MEASUREMENT OF MAGNETIC FIELDS
Anthony René Barringer, Agincourt, Ontario, Canada, and Sholly Kagan, Cochituate, Mass., assignors to Barringer Research Limited
Filed Aug. 9, 1960, Ser. No. 48,532
5 Claims. (Cl. 324—.5)

This invention relates to a method and apparatus for the measurement of magnetic fields and more particularly to a magnetometer system employing a nuclear resonance frequency sensing means.

It is known that the precession of the nuclei of the atoms of a sample of matter placed in a magnetic field precess about their axes at a frequency directly proportional to the field strength and inversely proportional to the gyromagnetic ratio of the nuclei, which is a constant for the matter of the sample. This phenomena is commonly known as nuclear resonance. Whilst theoretical analysis and explanation of nuclear resonance involves considerable amount of study, it is sufficient for the purposes of the present invention to note the effects which are generally considered to be suitably obtainable by either forced or free precession. Further reference relating to nuclear resonance may be made to the following: Physical Revue, 1946, vol. 69, 127, F. Bloch, W. W. Hansen, M. Packard. Physical Revue, 1946, vol. 69, 37, E. M. Purcell, J. C. Torrey, R. V. Pound.

Nuclear precession in the earth's magnetic field may be obtained in a sample of water or a light hydrocarbon in at least two ways: In one method, the nuclei are initially aligned with a strong artificial magnetic field which is induced in a sample at a substantial angle approaching 90 degrees to the earth's magnetic field, said artificial field then being abruptly removed. This causes the nuclei to precess about an axis which is aligned with the earth's magnetic field at a frequency which is exactly proportionate to the natural magnetic field strength at that point. An alternative method of inducing nuclear precession is to excite the sample at a predetermined frequency (e.g. approximately 56 megacycles per second in the case of water) thereby to induce paramagnetic electron spin resonance in the sample. If the sample is suitably doped with a paramagnetic salt, nuclear resonance will be translated to the nuclei by the so-called Overhauser effect. For further discussion of the Overhauser effect reference may be made to A. Overhauser Phys. Rev. 89, 1953 p. 689. In either case the presence of nuclear resonance can be detected with a suitable sensing coil placed around the sample and this frequency may be determined.

It is amongst the objects of this invention to provide a method and apparatus for measuring the frequency of precession of the nuclei of a given sample.

It is a further object of this invention to provide a method and apparatus of measuring magnetic fields.

It is a still further object of the invention to provide a method and apparatus for measuring the frequency of precession of the nuclei of a given sample precessing under the influence of the earth's magnetic field in readings directly proportional to the gamma strength of the field influencing the precession of the sample.

It is still a further object of the invention to provide a magnetometer system and method of measurement providing direct readings of changes of the magnetic field of the order of five gammas or less.

Further objects and advantages of the invention will be apparent from a consideration of the following description and drawings in which:

FIGURE 6 shows a wiring diagram of a series of frequency doublers in cascade; and FIGURE 7 shows a block diagram incorporating a refinement of a portion of the block diagram of FIGURE 1 for applying corrections for diurnal variations of the magnetic field.

Figure 1:
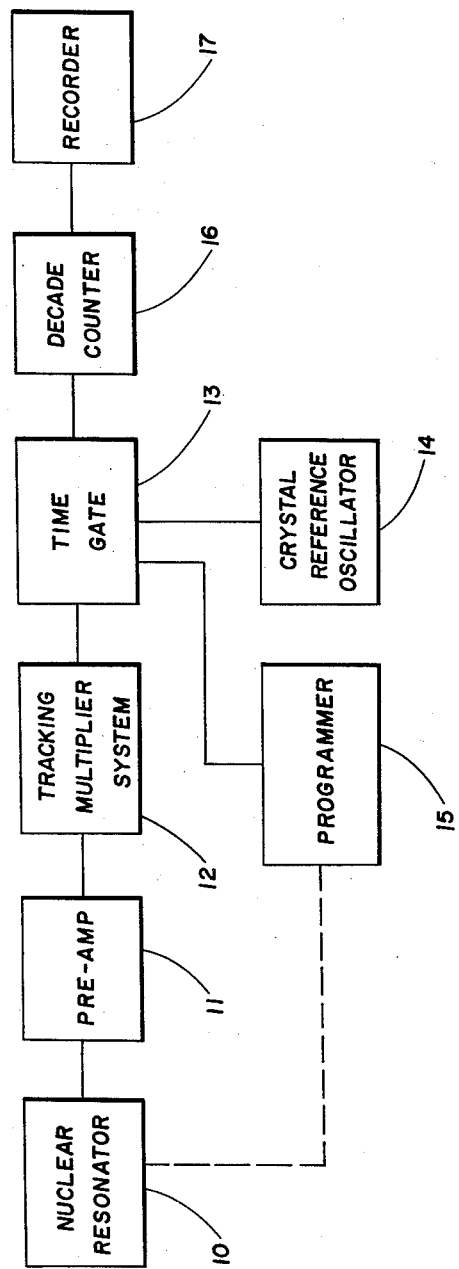
FIGURE 1 shows a block diagram of a system of the invention.

Referring now to FIGURE 1, there is shown a nuclear resonator 10 which may be of the free or forced precession Overhauser effect type. The signal from the nuclear resonator 10 is passed through preamplifier 11 to the tracking multiplier system 12 described in greater detail hereafter. The multiplied signal is then passed to the time gate 13 which serves to sample the multiplied signal for a specific period of time. The duration of the sampling by time gate 13 is controlled by the crystal reference oscillator 14 utilizing conventional techniques. A programmer 15 is arranged to trigger the opening of time gate 13 in order to provide any predetermined number of readings per minute. In the case where free precession is used in nuclear resonator 10, it is necessary that programmer 15 should sequentially activate the nuclear resonator 10 and trigger the time gate 13 upon removal of the polarizing current in the nuclear resonator 10. See dotted lines FIGURE 1. The portion sampled by time gate 13 is fed to a decade counter 16 which may be a standard Hewlett-Packard industrial counter. The counter output is fed to a suitable recorder 17 which may be of the punched tape or rectilinear pen type.

The resonant frequency of the hydrogen nuclei varies by a factor of 4257.67 cycles per second per gauss, a figure known as the gyromagnetic ratio. This is equivalent to 0.0002349 gauss per cycle per second or 23.49 gammas per cycle per second—the gamma unit being $10^{-5}$ gauss. If the nuclear resonance frequency is multiplied by 16 using an electronic multiplier the sensitivity becomes $$\frac{23.49}{16}$$

or 1.4681 gammas per cycle per second. If this frequency is electronically counted for exactly 1 second then the counter output is given in units of 1.4681 gammas. Alternatively if the same frequency is counted for 1.4681 seconds then the sensitivity becomes exactly 1 gamma per count. If the count is made for $$\frac{1.4681}{5}$$

or .2936 seconds, the sensitivity is 5 gammas per count. Count periods of these precise durations can readily be obtained using an electronic gate control by a suitable crystal oscillator reference source. By way of example, a commercial frequency counter of the type employing a 100 kc. reference frequency may be easily modified for this application. This type of counter normally has gate times such as .01 second, 1 second and 10 seconds as a standard feature. By a simple modification of the phantastron circuits controlling the gate such a counter may be made to count for 0.3 second and by further substituting a quartz crystal cut to a resonant frequency of 102.186 kc. for the 100 kc. crystal normally supplied, the counter will now count for .2936 second instead of .3 second, and may be used to measure field strengths in 5 gamma units.

Figure 2:
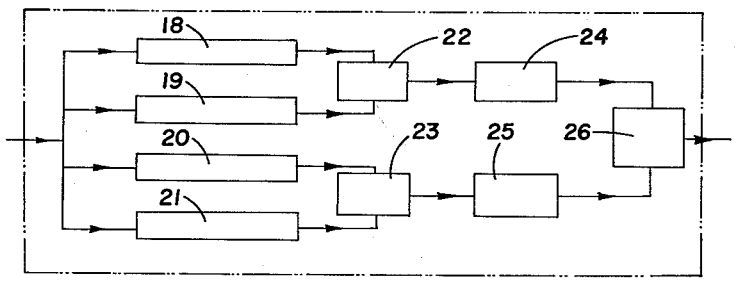
FIGURE 2 shows a more detailed block diagram of the tracking multiplier system of FIGURE 1.
Figure 5:
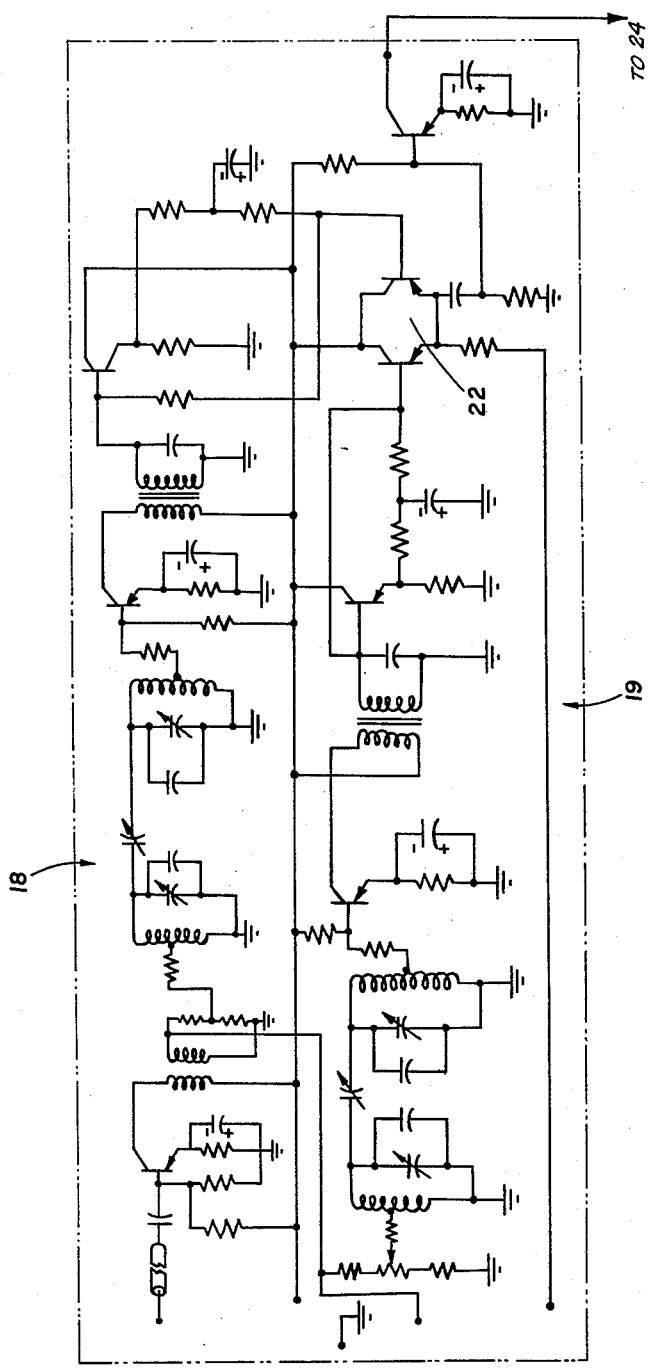
FIGURE 5 shows schematic wiring diagram of one pair of the comb amplifier filters of the multiplier system of the invention.

The tracking multiplier system 12 is shown in greater detail in FIGURE 2 to which reference is now made. The amplified signal is fed simultaneously to four comb amplifier-filters 18, 19, 20 and 21. The comb filters are arranged in two banks of two, i.e. amplifier-filters 18 and 19 and 20 and 21. Each filter is designed to pass only a narrow frequency range of the order of about 200 cycles or 10 percent of the centre frequency of the filter for reasons which will become apparent hereafter. The total range of amplifier-filters 18, 19, 20 and 21 may conveniently be from 2200 to 3100 cycles. This range will cover magnetic fields of between 52,000 gammas and 73,000 gammas which is adequate for the territorial area of Canada and the Northern parts of the United States. It will be obvious that by a simple variation of circuit parameters the equipment may be made to operate over any desired frequency. Furthermore the overall bandwidth of the system may be increased by adding additional multiplier channels. The bandwidth of the individual filters is confined to 10% or less of the centre frequency of the filter in order to obtain a good signal to noise ratio. This is particularly important since the multipliers require a good quality signal to operate satisfactorily. The signals received and passed through each pair of filters 18, 19, and 20, 21, proceed to steering gates 22 and 23 respectively. A typical schematic wiring diagram for a pair of filters such as 18 and 19 together with the corresponding steering gate 22 is shown in FIGURE 5. The steering gates switch out the weaker signal from their associated filters and pass the stronger signal to the multipliers 24 and 25. In practice one of steering gates 22, 23 will be passing a signal and the other noise to multipliers 24 and 25. After multiplication the signal from one multiplier and the random noise output from the other are passed to a final steering gate 26 which eliminates the random noise and allows the desired signal to pass to the time gate 13.

Figure 3:
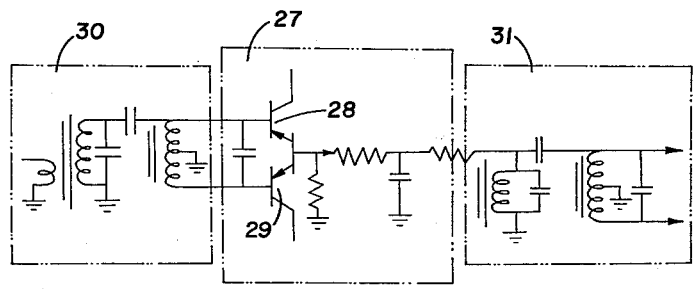
FIGURE 3 shows a schematic wiring diagram of one of the frequency doublers and adjacent filters.

Successful operation of the frequency multipliers 24, 25 is achieved by the use of a series of four frequency doublers 27 arranged in cascade. The operation of the frequency doublers will become more apparent from a consideration of the following with particular reference to FIGURE 3. The frequency doubling is conveniently achieved by use of full wave rectification by means of a pair of emitter follower connected transistors 28 and 29. The output of the frequency doubler 27 will normally contain a large number of harmonics. To eliminate difficulties in subsequent multipliers the input and output signals to and from the frequency doubler 27 are passed through band pass filters 30 and 31. In these filters selected ferrite pot cores are used as the inductive elements and also for reactive parametric limiting. The output from frequency doubler 27 is passed through filter 31 and subsequently through additional filters and frequency doublers in cascade (see FIGURE 6) to achieve any desired binary multiplication factor which may conveniently be sixteen.

Figure 4:
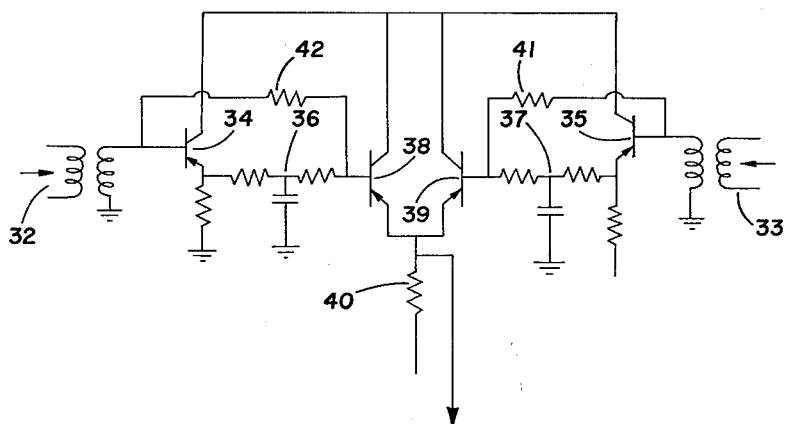
FIGURE 4 shows a schematic wiring diagram of the steering gate.

The steering gates 22, 23 and 26 as previously described are designed to permit the stronger one of two A.C. signals to pass through the gate to the exclusion of the other. In FIGURE 4 there is shown the signal input connections 32 and 33 which for example, in the case of steering gate 22 would be fed from filters 18 and 19. The output voltage of each signal is recified by means of transistors 34 and 35 and integrated by networks 36 and 37; and is applied respectively to two differentially connected emitter follower transistors 38 and 39. The higher rectified voltage will cause the transistor 38 or 39 to which it is applied to monopolize the total current available through resistor 40. The signals are connected to the steering transistors 38 and 39 via isolation resistors 41, 42. The larger of the signals will pass through the "on" transistor i.e. the transistor with the largest voltage applied to its base and will appear on resistor 40. The transistors used may be PNP germanium audio transistors of type 2N591 manufactured by Radio Corporation of America.

It will be appreciated that with the apparatus described, it is possible to obtain recorded readings directly in gammas or simple multiples of gammas. This type of recording presents many advantages for use where continuous recordings are required such as in airborne systems. For example by using a decade counter 16 and feeding an analogue voltage output from each decade to a separate trace pen on the recorder 17, it is possible to note locations at which the instrument has traversed through contour interval points such as 10 gammas, 100 gammas and 1000 gammas. This feature greatly facilitates the production of magnetic contoured maps. The contour interval used in practice may be adjusted to 50 gammas or 100 gammas for example, according to the count period used and determined by the time gate 13. The contour maps produced in this manner would not be corrected for diurnal variations of the earth's magnetic field. However it is possible to add a subtracting gate to effect these corrections; such an embodiment as shown in FIGURE 7. Referring to FIGURE 7, it will be seen that a subtracting gate 43 may be placed between the time gate 13 and the decade counter 16. The subtracting gate is comprised of a pre-set counter in conjunction with a gate. The pre-set counter may be adjusted to receive a predetermined number of cycles from the time gate before opening its gate to allow the remaining signal from the time gate to pass to the counter 16.

In this manner a predetermined number of gammas may be continuously subtracted from the output to allow for diurnal variations. For example where it is desired to conduct an airborne survey over an extended area and period of time, a base station would be established in or immediately adjacent to the area to be surveyed. Diurnal variation at the base station can then be continuously monitored and the necessary corrections passed by radio at frequent intervals to the airborne operator who can effect the required corrections by means of the subtracting gate 43. In this way it is possible by applying the diurnal corrections before the counter 16 to retain the automatic contour point selection feature of the magnetometer system. It will be obvious that the reference datum at the base station must be selected so as to enable all diurnal corrections to be effected by subtraction.

It will be appreciated that variations and modifications may be made without departing from the scope of the invention as defined in the following claims.

What we claim is:

1. Apparatus for measuring magnetic fields comprising: a nuclear resonance frequency sensing means; amplifier means amplifying the signals received from said nuclear resonance frequency sensing means; at least one pair of parallel band pass filters covering consecutive frequency bands; steering gate means for each said pair of filters switching out the weaker of the filtered signals; at least two frequency doublers connected in cascade for multiplying the signal passed by said steering gate; band pass filtering and wave shaping means between said frequency doublers; reference oscillator controlled time gate means for sampling portions of the multiplied signal; counting means counting the number of cycles of said sampled portion of said multiplied signal.

2. Apparatus for measuring magnetic fields comprising: a nuclear resonance frequency sensing means; amplifier means amplifying the signals received from said nuclear resonance frequency sensing means; a plurality of multiplier channels; a pair of parallel band pass filters covering consecutive frequency bands in each channel; a steering gate means for each pair of filters switching out the weaker of the filtered signals; at least two frequency doublers connected in cascade for multiplying the signal passed by said steering gate; band pass filtering and wave shaping means disposed between said frequency doublers; further steering gate means switching out the weaker of the multiplied signals passing through said multiplier channels; time gate means sampling the multiplied signal passed through said last mentioned steering gate means; control means precisely governing the open period of said time gate means; and means counting the number of cycles of the signal passed through said time gate during its open period.

3. Apparatus for measuring magnetic fields comprising: a nuclear resonance frequency sensing means; amplifier means amplifying the signals received from said nuclear resonance frequency sensing means; a plurality of multiplier channels; a pair of parallel band pass filters covering consecutive frequency bands in each channel; a steering gate means for each pair of filters switching out the weaker of the filtered signals; at least two frequency doublers connected in cascade; for multiplying the signal passed by said steering gate; band pass filtering and wave shaping means disposed between said frequency doublers; further steering gate means switching out the weaker of the multiplied signals passing through said multiplier channels; time gate means sampling the multiplied signal passed through said last mentioned steering gate means; control means precisely governing the open period of said time gate means; further subtracting gate means receiving the sampled portion of said multiplied signal from said time gate means; a pre-set control counter within said subtracting gate means, said control counter being operable to open said subtracting gate means after receiving a predetermined number of cycles of the multiplied signal received from the time gate; means counting the number of cycles of the signal passed through said subtracting gate during its open period; and recording means for continuously monitoring the output of said counting means.

4. Apparatus for measuring magnetic fields and comprising: a nuclear resonance frequency sensing means; at least one pair of parallel band pass filters covering consecutive frequency bands; steering gate means for each said pair of filters switching out the weaker of the filtered signals; at least two frequency doublers connected in cascade for multiplying the signal passed by said steering gate means; band pass filtering means between said frequency doublers; time gate means for sampling portions of the multiplied signal, and means counting the number of cycles of said sampled portion of said multiplied signal.

5. Apparatus for measuring magnetic fields and comprising: a nuclear resonance frequency sensing means; at least one pair of parallel band pass filters covering consecutive frequency bands; steering gate means for each said pair of filters switching out the weaker of the filtered signals; at least two frequency doublers connected in cascade for multiplying the signal passed by said steering gate means; band pass filtering means between said frequency doublers; further steering gate means switching out the weaker of the multiplied signals passing through said multiplier channels; time gate means sampling portions of the multiplied signal passing through said last mentioned steering gate means; and means counting the number of cycles of said sampled portion of said multiplied signal.

References Cited in the file of this patent

UNITED STATES PATENTS

| | | |
|---|---|---|
| Re. 23,769 | Varian | Jan. 12, 1954 |
| 2,927,271 | Gordon | Mar. 1, 1960 |
| 2,954,422 | Dickey et al. | Sept. 27, 1960 |
| 2,987,674 | Shain | June 6, 1961 |
| 3,030,571 | Dessler | Apr. 17, 1962 |

FOREIGN PATENTS

| | | |
|---|---|---|
| 1,180,455 | France | Dec. 29, 1958 |

OTHER REFERENCES

Waters et al.: Geophysical Prospecting, vol. 4, No. 1, March 1956, pp. 1 to 9.

Schultheiss et al.: Journal of Applied Physics, vol. 25, No. 8, August 1954, pp. 1025 to 1036.